F. M. SUTTON.
ELECTRIC OVEN.
APPLICATION FILED OCT. 21, 1918.
1,336,105.
Patented Apr. 6, 1920.
4 SHEETS—SHEET 1.
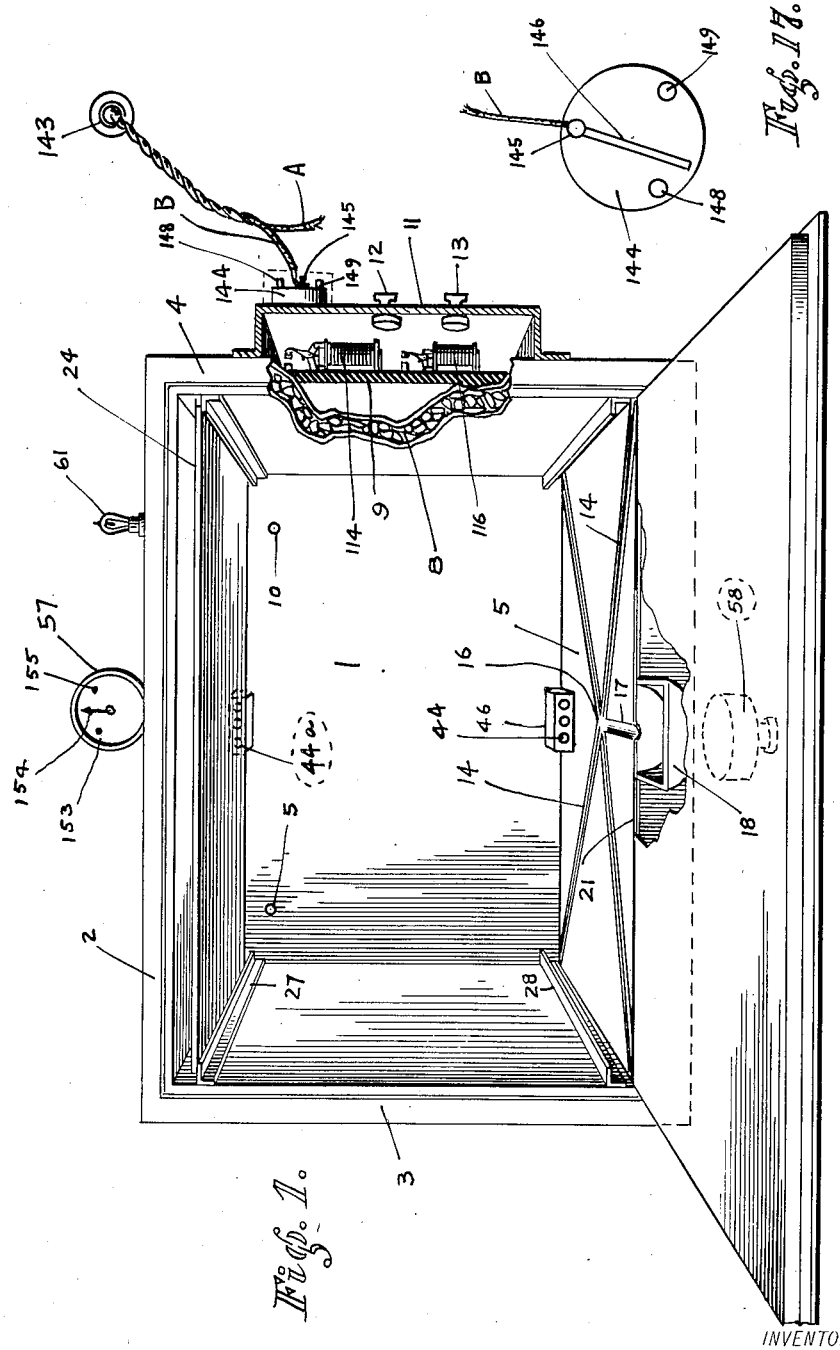
INVENTOR
FRANK M. SUTTON
BY
ATTORNEY

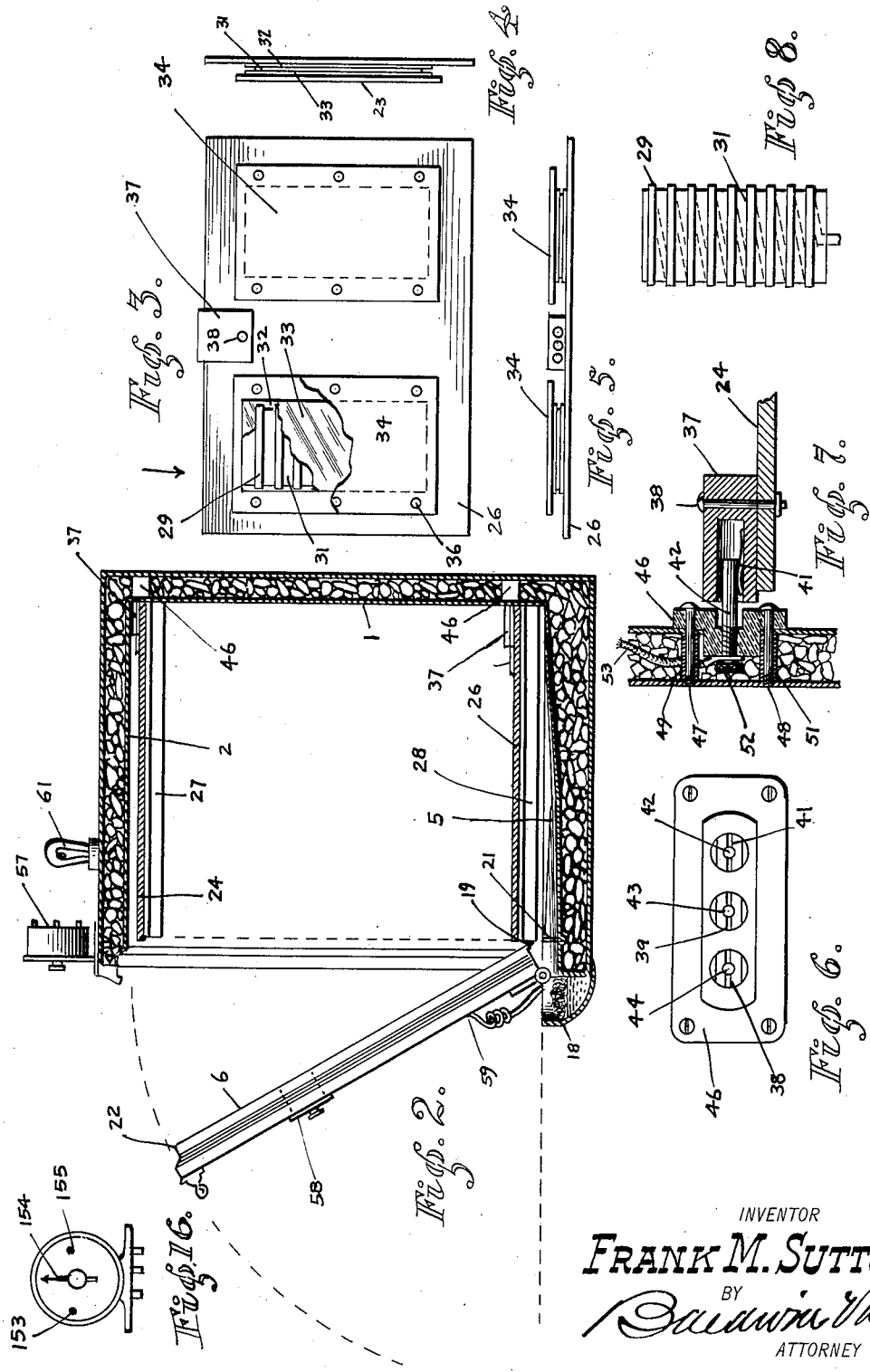

F. M. SUTTON.
ELECTRIC OVEN.
APPLICATION FILED OCT. 21, 1918.
1,336,105.
Patented Apr. 6, 1920.
4 SHEETS—SHEET 3.
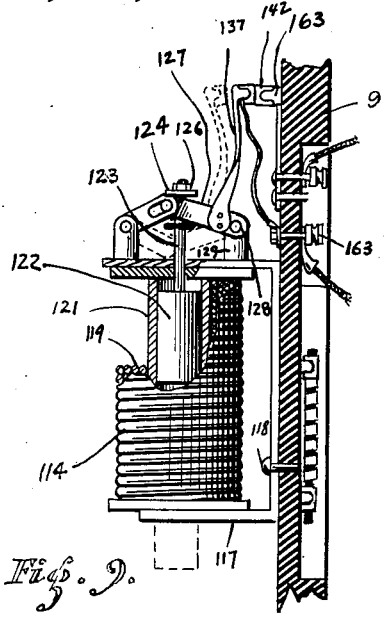
Fig. 9.
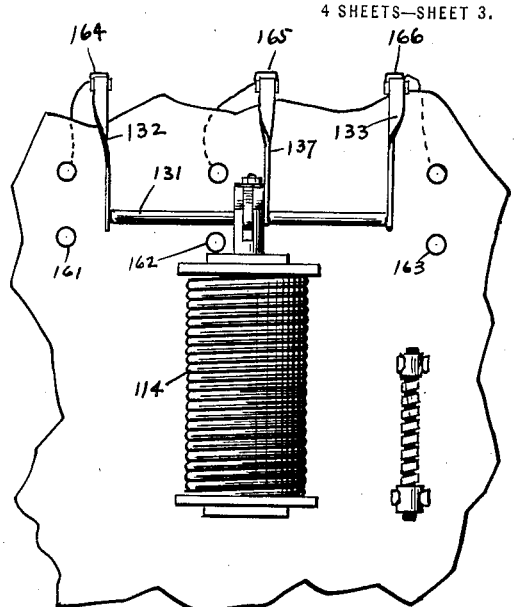
Fig. 10.
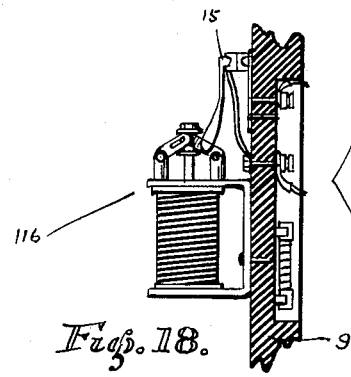
Fig. 18.
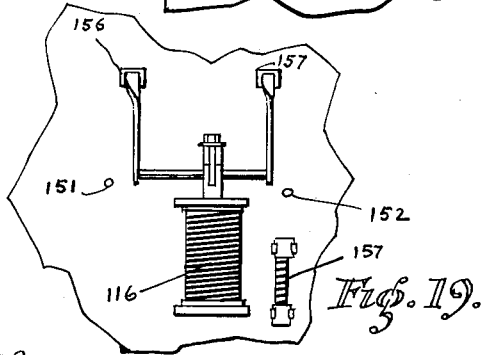
Fig. 19.
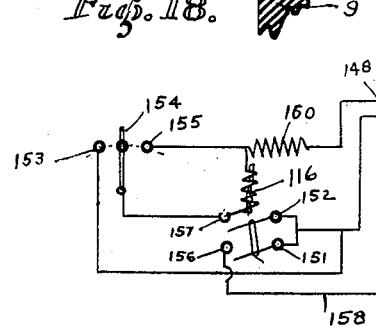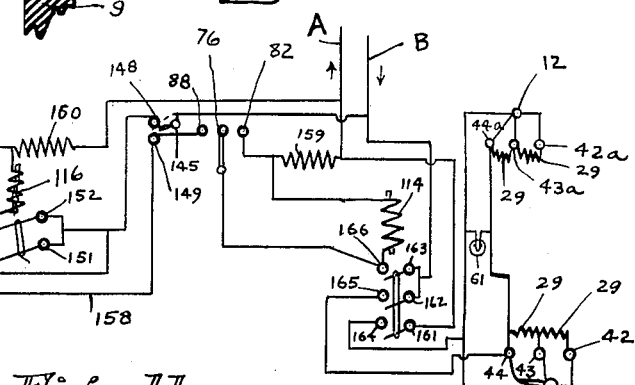
Fig. 11.
INVENTOR
FRANK M. SUTTON
BY
Baldwin Vales
ATTORNEY F. M. SUTTON.
ELECTRIC OVEN.
APPLICATION FILED OCT. 21, 1918.
1,336,105.
Patented Apr. 6, 1920.
4 SHEETS—SHEET 4.
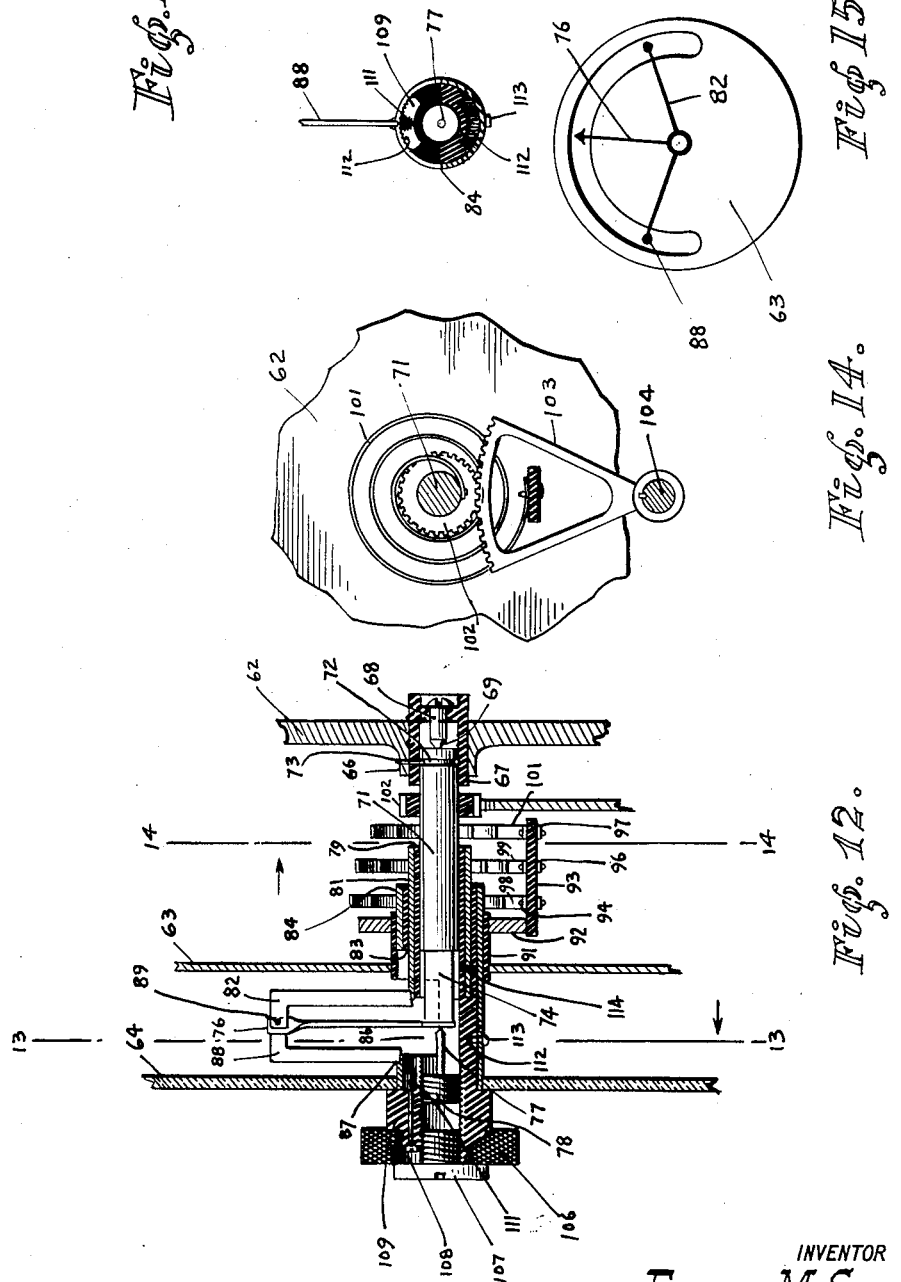
INVENTOR
FRANK M. SUTTON
BY
Baldwin Vale
ATTORNEY

UNITED STATES PATENT OFFICE.

FRANK M. SUTTON, OF SAN FRANCISCO, CALIFORNIA.

ELECTRIC OVEN.

1,336,105.  Specification of Letters Patent.  Patented Apr. 6, 1920.

Application filed October 21, 1918. Serial No. 258,925.

*To all whom it may concern:*

Be it known that I, FRANK M. SUTTON, a citizen of the United States, and a resident of the city and county of San Francisco, State of California, have made a new and useful invention, to wit, Improvements in Electric Ovens; and I do hereby declare the following to be a full, clear, concise, and exact description of the same.

The invention relates particularly to an improved electrically heated oven.

It has for its objects:—

First. To provide an oven heated by electrical resistance units and provided with means for automatically maintaining the oven heat within a given range of temperature by means of a thermostatic control, which interrupts the electrical circuit at a predetermined maximum heat, and restores said circuit when the oven temperature falls to the lower limit of the predetermined range, operating through a relay.

Second. To provide an electrically heated, thermostatically controlled oven provided with means for operating the thermostat control to a predetermined schedule of time, said means comprising a clock arranged to contact at variable set points to electrically operate the various controls through a relay.

Third. To provide an electrically heated oven in which the heat can be automatically maintained, and alternately applied and discontinued to make use of the fireless cooker principle of heat storage.

It is obvious that an oven built to accomplish these objects will effect a considerable saving of electrical energy and will be a decided advance in this art.

Such an oven will be adaptable to all the ordinary uses of a kitchen range and at the same time possess the advantages of a fireless cooker with the additional advantage of being able to maintain the fireless cooker heat indefinitely or for a predetermined period of time.

It will be seen that in using the novel structure hereinafter described, it will be possible to apply any desired amount of heat for any given time to the article to be cooked. As a result of this, a uniformity of cooking may be produced that would be impossible with any similar device now in use, Some articles of food are best prepared when cooked slowly or at a low temperature for a considerable time, while others are more delectable if subjected to a much higher degree of heat at first.

The capacity of this oven is limited only by the knowledge of the operator, as any culinary operation that has given a satisfactory result may be duplicated exactly by proper previous adjustment of the various controls.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In the accompanying four sheets of drawings wherein like numerals refer to like parts, Figure 1 is a perspective view of my oven with the door opened down to show the interior walls, portions of which are broken away to show the electric and thermostatic controls, Fig. 2 is a central vertical section of my oven, Fig. 3 is a plan view of a heating unit, Fig. 4 is an end view of same, Fig. 5 is a side view looking in the direction of the arrow on Fig. 3, Fig. 6 is a plan view of a three pole plug switch, Fig. 7 is a section on the line 7—7 of Fig. 6, Fig. 8 is a view showing the manner in which resistance is wound for the heating unit, Fig. 9 is a side view of a solenoid operating a three pole switch, Fig. 10 is a front view of the parts shown in Fig. 9, Fig. 11 is a diagrammatic plan of the wiring throughout the oven, Fig. 12 is a central sectional view of the tubular shafts operated by a segment within the thermostat.

Fig. 13 is a section on the line 13—13 of

Fig. 12 looking in the direction of the arrow,

Fig. 14 is a section on the line 14—14 of Fig. 12, looking in the opposite direction from that of Fig. 13, Fig. 15 is a front elevation of a thermostat, Fig. 16 is a front elevation of a clock, Fig. 17 is a plan view of a three point selective switch, Fig. 18 is a side view of a solenoid operating a two pole switch, and Fig. 19 is a plan view of same showing resistance at one side.

Referring to the drawings, the numeral 1 indicates the rear wall of my oven, 2 the upper wall, 3 and 4 the side walls, and 5 the bottom of the oven. The oven is closed by a door 6 suitably hinged thereto, as shown at 7. The surrounding walls of the oven are of double construction, and in the space between the double walls, as shown at 8, is a layer of suitable material adapted to retain heat and minimize the loss thereof by radiation. The rear wall 1 of the oven is provided with vents 5ª and 10.

Secured to the side wall 4 is a slab 9 of insulating material such as transite or slate, to which are secured the various electrical controls. Surrounding the said controls is a box 11 through which extend switch buttons 12 and 13.

The bottom 5 of the oven is provided with a plurality of gutters 14 adapted to drain said floor to a central point 16 where it is conveyed through a gutter 17 to a sump 18. The purpose of this construction is to drain the floor 5 of any fluid that may be in the oven either from condensation or overflow and collect same in a suitable receptacle outside the oven without undue loss of heat.

It will be seen from Fig. 2 that the sump 18 is integral with or secured to the front wall of the oven in such a manner as to form a support for the door 6 when it is in a horizontal position.

The door 6 has a downwardly projecting lip 19 adapted to enter a groove 21 when the oven door is closed, and is also provided with safe door edge as shown at 22 of conventional form to better inclose the heat. Heat is applied to the oven by means of heating units 23, a plurality of which are secured to shelves 24 and 26 supported respectively near the top and bottom of the oven on supports 27 and 28.

It will be understood from the description following that the heating units are secured to the shelves and may be withdrawn from the oven with the shelves and are provided with means for plugging in on the electric circuit when pushed to the rear wall of the oven.

In detail, each of the heating units comprises a coil 29 of suitable resistance material coiled, as shown in Fig. 8, around a plate 31 of mica or other suitable insulation.

Superimposed on either side of the coil 29 are two sheets 32 and 33 of mica or other suitable insulation. On top of this laminated structure is a sheet 34 of iron, and the entire body is secured to the shelf 24 by means of screws 36.

At a point near the center of the rear edge of the shelves 24, 26 are plugs 37 secured to said shelves. The plugs 37 are provided with clips 38, 39 and 41 for engaging respectively terminal posts 42, 43 and 44 which are embedded in an insulting plate 46 secured to the inner oven wall 1 by bolts 47, 48, extending through the double wall structure of the oven and threaded into the outer shell of said oven, as shown in Fig. 7. The bolts 47 and 48 are surrounded by bushings 49 and 51 which space evenly the walls of the inner and outer shells of the oven. The terminal posts 42, 43 and 44 are embedded in the insulating plate 46 and extend through said plate having threaded portions adapted to receive thumb nuts 52 for securing ends of electrical wires as shown at 53, which are embedded in the insulating material between the outer and inner walls of the oven.

The upper outside wall of the oven is provided with a clock 57 which is removably secured to said oven by means of a three way plug such as has been described for each heating unit.

In the oven door 6, or at any suitable place in the walls of the oven, is provided a thermostat 58 secured thereto having electrical wires connected thereto and extending through the inside of said door to a point 59 near the hinge 7 at which point wires are inclosed in a flexible spiral coil to permit the pivotal movement of the door. The said wiring is then passed through between the walls of the oven to suitable terminals on the insulated plate 9.

The oven is provided with a pilot lamp 61, wiring for which is also embedded between the two walls of the oven, and the said light is interposed on the electrical heating circuit, to announce the opening and closing of said circuit.

It will be obvious to those skilled in this art that the system of control used in this invention is not confined to use in ovens, and that the same thermostatic control, with or without the time element, can be used on sterilizers, incubators, pasteurizers and driers; or on a car or dwelling heating system, and made to control electricity, steam or gas. As the solenoid can be made to operate the control valves of a steam or gas supply or the draft of a furnace of any heating system by substituting a steam gage mechanism in place of a thermostat, this same control can be used on a steam vulcanizer to control the electric heating units. It can also be applied to refrigerators and cold storage plants and the relays made to control valves and driving power.

In detail, the thermostat control of the heating circuit comprises a series of telescoping tubes, as shown in Figs. 12, 13 and 14, in which 62 represents the casing or rear wall of a thermostat of any conventional form, 63 the dial and 64 the transparent face plate of said thermostat.

The rear wall 62 is provided with a boss which forms a bearing 66 in which is an insulated bushing 67. A screw 68 is threaded through the rear wall 62, and is provided with a point 69 to form a conical bearing at one end for a shaft 71. The shaft 71 is provided with an annular groove 72 which is traversed by an insulated pin 73. The shaft 71 has a reduced portion 74 which is squared to receive a contact carrying arm 76. The squared portion 74 is conically drilled at the end to form a bearing for a point 77 integral with a screw 78.

Surrounding the shaft 71 is an insulated bushing 79, surrounding which is a brass tube 81, to one end of which is suitably secured an arm carrying contact 82. Surrounding the brass tube 81 is an insulated tube 83, which in turn is surrounded by a brass tube 84 which extends through the dial 63 and terminates on the front line of the face plate 64. The tube 84 is cut away as shown at 86 to permit the partial rotation of the arms 76 and 82.

Suitably secured, as shown at 87, to the tube 84 is an arm carrying contact 88. The arms 82 and 88 are L-shaped at their extremities, and are adapted to overlap on either side the arm 76. All of the arms 82, 88 and 76 are provided with platinum contact points 89 which register with each other when the arms are contacted.

Surrounding the tube 84 is an insulated tube 91 which insulates the tube 84 from a bridge 92 which extends transversely through the housing of the thermostat and forms a bearing for the previously described tubular shafts. Suitably secured to the lower edge of said bridge is an insulated plate 93 which carries terminal binding posts 94, 96 and 97.

Secured at one end of the binding post 94 is a spiral spring 98, which is secured at its opposite end to the tube 84. The purpose of this spring is to form a flexible means to conduct the electrical current to the arm 88 as it is rotated.

Secured to the binding post 96 is one end of a spiral spring 99 similar to the spring 98 and secured at its opposite end to a shaft 81. The spring 99 conducts electrical current to the arm 82 while it is being rotated.

Secured to the binding post 97 is one end of a spiral spring 101, the opposite end of which is secured to the shaft 71 and conducts electrical current to the arm 76 while it is rotated.

The shaft 71 is rotated by means of an insulated pinion 102 suitably secured to said shaft and in mesh with a segment 103 which is secured to and rotated by a shaft 104 which is a part of any conventional thermostat.

In order to form an external means of operating the arms 88 and 82 to fix a range of operation for the thermostat, the insulated tube 79 extends through and beyond the transparent face plate 64, and is milled as shown at 106. The center of the tube 79 is internally threaded to receive the screw 78 and also a plug 107. The purpose of the plug 107 is to cover a recess 108 in which is a screw 109 extending toward the transparent face plate 64 at which point it is rigidly secured to a pinion 111 which meshes with the inner milled edge 112 of the tube 84.

It will be seen from this construction that, by removing the plug 107 and turning the screw 109, the pinion 111 will cause the arm 88 to rotate with respect to the insulated tube 79. The tube 79 is provided with a groove 112 extending through a portion of its periphery which engages a screw 113 adapted to prevent the longitudinal movement of said tube, and at the same time allow its rotation.

The tubes 79, 81 and 83 are rigidly connected by an insulated pin 114 to insure their rotation in unison.

The temperature and time controls for the circuit breakers controlling the heating circuit consist of a pair of solenoids 114 and 116 which are alike in every respect except that the solenoid 114 reciprocates a three pole switch, while the smaller solenoid 116 operates a two pole switch. Both of said solenoids are secured to the insulated slab 9 by U-shaped plates 117 secured as shown at 118 to said insulated plate. The coil 119 of said solenoid surrounds a metal core 121 in which is slidably fitted a plunger 122 having a reduced portion 123 upon which are washers 124, held in place by a nut 126. The purpose of the washers 124 is to reciprocate vertically one end of a lever 127, pivoted as shown at 128 to a boss 129, through which extends a shaft 131 carrying contact fingers 132 and 133, secured to said shaft 131. The lever 127 carries a finger 137. All of said fingers carry carbon contacts 164, 165 and 166 insulated from said fingers which contact with similar contacts 161, 162, 163 held by clips 142 suitably secured to the slab 9.

It will be seen by this construction that when an impulse operates the solenoid 114, the three fingers will alternately make and break the heating circuit.

The wiring for my oven consists of a twisted pair of wires A and B connected to a suitable socket 143. The wire B is secured to one point 145 of a three pole selective switch 144 provided with a switch lever 146 adapted to contact with either of points 148, 149, see Fig. 17. When said switch engages the point 148, the current goes to fingers 151, 152 operated by solenoid 116. The solenoid 116 not being energized, the current goes to the starting element 153 on the clock (the points 151, 152 being open), see Fig. 11.

At the scheduled time, when the hand 154 engages the point 153, the solenoid 116 becomes energized through resistance 160 establishing a circuit back to the supply wire A, closing fingers 151 and 152 by engaging them with contacts 156 and 157.

As soon as these fingers are contacted, the energy from B through 152 establishes a circuit through contact 157 solenoid 116 and resistance 160 back to the supply line A; thus the points 153, 154 on the clock 57 can be opened and the solenoid 116 will continue to be energized. At the same time, a circuit is established from B through selective switch 144 through finger 151 through point 156 back on wire 158 by point 149 on selective switch 144 to the low heat point 88 on the thermostat 58. The thermostat being cold 76 engages 88 and a circuit is established through solenoid 114, and the current passes out through the resistance 159 back to the supply wire A, by this means this solenoid 114 becomes energized, the points 161, 162, 163 are contacted with points 164, 165 and 166, and the current from B is established through 163 to 166 through solenoid 114 out through its resistance 159 back to the wire A at the same time 162 engages 165 and 161 engages 164, and the current from wire B passes out through 165 to the point 44 and 44ᵃ respectively through the heating elements 29, back through points 43, 43ᵃ, 42 and 42ᵃ, through the three point heat control switches 12 and 13, thence back through 164, 161 respectively returning to the line A.

The selective switches 12 and 13 are only to control the heating units 29 for low, medium and high heats, for slow moderate and quick heating respectively on either top or bottom plates 24, 26. Either of said plates can be thus regulated at will. Solenoid 114 being energized, thus closing points 163 and 166. The point 76 on the thermostat now can disengage point 88 without breaking a circuit. As the thermostat is actuated by heat, the point 76 engages 82 at the predetermined point and a momentary rush of current takes place through resistance 159 of sufficient capacity to carry the full line voltage from A and B, thus shunting the solenoid 114 which becomes demagnetized, opening by gravity the points 161, 162, 163 and thus the circuit is broken from 159. The resistance 159 is large enough, however, to allow free passage of current when 114 is magnetized. Thus the stored heat is maintained in the oven from the units 24 and 26 for a considerable time, and as the oven cools to the lowest predetermined degree at which point 76 again engages 88, the heating operation is repeated. This cycle of operations continues until the hand of clock 154 reaches point 155 on the dial when the momentary short circuit takes place through the resistance 160 when the solenoid 116 becomes demagnetized and the points 151 and 152 are opened by gravity, thus the starting point 88 of the thermostat is opened through 156 and the thermostat cannot cause the relay 114 to become energized, and the oven cooks on stored heat.

It will be especially noted that when the time element intercepts the thermostat, if the oven is being heated, the heating operation is continued undisturbed until the maximum heat is reached before the current is shut off. Thus the heating process can only be intercepted at the beginning of a cycle which is an advantage in that the oven and contents are at all times brought up to the highest specified point of heat before the current is shut off.

If it is desirable to operate the oven without using the clock, the switch 144 is turned to contact with 149 and current from wire B will pass through points 145, 149 to the point 88 on the thermostat and the cycle of heating operations continues indefinitely until the selective switch 144 is opened.

It will be obvious that the points of contact 153, 155 on the clock and the points of contact 82 and 88 on thermostat are movable pivotally to effect a predetermined range of operation, and that on the clock the points are independently movable, while on the thermostat they move in unison, and means are here provided for altering the relative position of said points on the thermostat.

Having thus described my invention, what I claim as new and desire to secure by Letters Patent of the United States is as follows:

1. In a device of the character described, the combination of an oven having double walls, a door for said oven having double walls, heat insulating material between said double walls, a drain in the bottom of said oven, a sump mounted upon the outside of said oven and adapted to receive fluid from said drain, heating units slidably carried on shelves, contact members carried by the rear of said shelves and the rear of said oven, conductors embedded in said insulating material and adapted to furnish current to said heating units, and means for regulating the curent furnished to said heating units.

2. In an electric oven the combination of an oven, a hinged door therefor, the walls of the oven and the door provided with heat insulating means, a thermostat mounted on the inner wall of the said door provided with electrical connections passing through the heat insulation means and provided with flexible means substantially axial with the door hinges, heat units mounted within the oven and connections thereto and the control of the thermostat controlling the flow of current to the heat units.

In testimony whereof, I have hereunto set my hand at San Francisco, California, this 17th day of September 1918.

FRANK M. SUTTON.

In presence of—
A. J. HENRY.